US012032880B2

(12) United States Patent
Endler et al.

(10) Patent No.: US 12,032,880 B2
(45) Date of Patent: Jul. 9, 2024

(54) METHOD AND DEVICE FOR SIMULATING A TECHNICAL SYSTEM

(71) Applicant: Robert Bosch GmbH, Stuttgart (DE)

(72) Inventors: Carola Endler, Sindelfingen (DE); Ji Su Yoon, Leonberg (DE); Johannes Von Keler, Tuebingen (DE); Julian Schmidt, Stuttgart (DE); Stephan Rhode, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 510 days.

(21) Appl. No.: 17/190,194

(22) Filed: Mar. 2, 2021

(65) Prior Publication Data
US 2021/0334435 A1  Oct. 28, 2021

(30) Foreign Application Priority Data
Apr. 23, 2020 (DE) .......................... 102020205131.3

(51) Int. Cl.
*G06F 30/20*  (2020.01)
(52) U.S. Cl.
CPC .................................... *G06F 30/20* (2020.01)
(58) Field of Classification Search
CPC ...................................................... G06F 30/20
See application file for complete search history.

(56) References Cited

U.S. PATENT DOCUMENTS

| 5,923,780 | A  | * | 7/1999 | Morfill ...................... G06T 7/41 |
| | | | | 382/218 |
| 8,626,522 | B2 | * | 1/2014 | Greenwood ........... G16H 50/30 |
| | | | | 705/2 |
| 8,670,964 | B2 | * | 3/2014 | Lin ........................ G01C 19/38 |
| | | | | 703/7 |
| 9,880,230 | B1 | * | 1/2018 | Hoff ....................... G06F 30/20 |
| 10,733,512 | B1 | * | 8/2020 | Andoni ................ G06N 3/086 |
| 10,948,887 | B2 | * | 3/2021 | Gardner ................ G16H 70/40 |
| 11,023,812 | B2 | * | 6/2021 | Sloane ............... G06Q 30/0202 |

(Continued)

FOREIGN PATENT DOCUMENTS

DE            10303489 A1    8/2004

OTHER PUBLICATIONS

Tsao, Min. "Subsampling Method for Robust Estimation of Regression Models", Mar. 29, 2012, Scientific Research, Open Journal of Statistics 2012, vol. 2, pp. 281-296 (Year: 2012).*

(Continued)

*Primary Examiner* — Iftekhar A Khan
(74) *Attorney, Agent, or Firm* — NORTON ROSE FULBRIGHT US LLP; Gerard A. Messina

(57) ABSTRACT

A method for simulating a technical system. Time series are obtained with the aid of a simulation model of the system, variable values being assigned to at least one epistemic parameter of the simulation model, at least one measurement series is obtained by corresponding measurements on the system, for each value of the epistemic parameter, a real-value error measure of the time series obtained for this value with respect to the measurement series and a distribution function of the error measure are calculated, and for the simulation, that value is used, for which the distribution function has the smallest distance to a Heaviside function.

19 Claims, 4 Drawing Sheets

(56) References Cited

U.S. PATENT DOCUMENTS

| | | | |
|---|---|---|---|
| 2010/0121609 A1* | 5/2010 | Gorinevsky | G05B 23/0281 |
| | | | 702/183 |
| 2010/0121618 A1* | 5/2010 | Greenwood | G16H 50/50 |
| | | | 703/2 |
| 2012/0022844 A1* | 1/2012 | Teixeira | A61B 5/7214 |
| | | | 703/11 |
| 2017/0147722 A1* | 5/2017 | Greenwood | G16B 5/20 |
| 2018/0060459 A1* | 3/2018 | English | G06F 30/20 |
| 2019/0154474 A1* | 5/2019 | Kausler | G01D 3/08 |
| 2019/0266499 A1* | 8/2019 | Maluf | G06N 5/04 |
| 2019/0392351 A1* | 12/2019 | Zuluaga | G06N 20/20 |
| 2020/0151619 A1* | 5/2020 | Mopur | H04L 67/12 |
| 2020/0379424 A1* | 12/2020 | Wang | G06Q 50/06 |
| 2020/0412752 A1* | 12/2020 | Shapoury | H04L 63/1433 |
| 2021/0026999 A1* | 1/2021 | Rhode | G05B 17/02 |
| 2021/0237772 A1* | 8/2021 | Meltz | G06F 30/20 |

OTHER PUBLICATIONS

Helton, J.C. "Representation of Analysis Results Involving Aleatory and Epistemic Uncertainty". Sandia National Laboratories Report SAND2008-4379, Aug. 2008 (Year: 2008).*

Maupin, Kathryn A. "Validation Metrics for Deterministic and Probabilistic Data". ASME Journal of Verification, Validation, and Uncertainty Quantification, 2018, vol. 3 (3) (Year: 2018).*

Liu, Yu. "Toward a Better Understanding of Model Validation Metrics". Jul. 2011, ASME, Journal of Mechanical Design vol. 133, pp. 071005-1 through 071005-13 (Year: 2011).*

* cited by examiner

METHOD AND DEVICE FOR SIMULATING A TECHNICAL SYSTEM

CROSS REFERENCE

The present application claims the benefit under 35 U.S.C. 119 of German Patent Application No. DE 102020205131.3 filed on Apr. 23, 2020, which is expressly incorporated herein by reference in its entirety.

FIELD

The present invention relates to a method for simulating a technical system. The present invention additionally relates to a corresponding device, a corresponding computer program, and a corresponding storage medium.

BACKGROUND INFORMATION

In software technology, using models to automate test activities and generate test artifacts in the test process is summarized under the generic term "model-based testing" (MBT). For example, generating test cases from models which describe the setpoint behavior of the system to be tested is well known.

Embedded systems in particular are dependent on coherent input signals from sensors and in turn stimulate their surroundings by output signals to various actuators. In the course of the verification and preceding development phases of such a system, in a control loop its model (*model in the loop, MiL*), software (*software in the loop, SiL*), processor (*processor in the loop, PiL*), or overall hardware (*hardware in the loop, HiL*) is therefore simulated together with a model of the surroundings. In automotive engineering, simulators corresponding to this principle for testing electronic control units are sometimes referred to as component test stands, module test stands, or integration test stands depending on the test phase and test object.

German Patent Application No. DE 10303489 A1 describes such a method for testing software of a control unit of a vehicle, a power tool, or a robotics system, in which a control loop controllable by the control unit is at least partially simulated by a test system in that output signals are generated by the control unit and these output signals of the control unit are transferred to first hardware components via a first connection and signals from second hardware components are transferred as input signals to the control unit via a second connection, the output signals being provided as first control values in the software and additionally being transferred to the test system via a communication interface in real time with respect to the control path.

Such simulations are widespread in various areas of technology and are used, for example to test embedded systems for suitability in power tools, engine control units for drive systems, steering systems, and braking systems, camera systems, systems having components of artificial intelligence and machine learning, robotics systems, or autonomous vehicles in early phases of their development. Nonetheless, the results of simulation models according to the related art are only incorporated to a limited extent in release decisions because of a lack of trust in their reliability.

SUMMARY

The present invention provides a method for simulating a technical system, a corresponding device, a corresponding computer program, and a storage medium according to the independent claims.

In accordance with an example embodiment of the present invention, the validation of time signals from simulation models involves a comparison between the output of the simulation model and measured values from experiments. The selected simulation or measuring signals describe a quantity of interest (QOI), which may be provided as a scalar or in a time series.

The provided approach in accordance with an example embodiment of the present invention furthermore takes the circumstance into consideration that validating a simulation on the basis of a measurement represents the simplest case of a validation. For this purpose, either two scalars or two time series are compared to one another. In practice, however, a comparison of multiple repeated experiments to multiple repeated simulations is usually desired, in order to reduce statistical uncertainties in the validation. In the case of scalars, this statistical comparison, which may be carried out, for example, with the aid of so-called confidence intervals, is routine. In addition, for scalar QOIs, validation with the aid of so-called probability boxes (p boxes) is provided. This involves a comparison of two cumulative distribution functions (CDF).

The validation of time series—for example with respect to possible phase or order of magnitude errors—may be derived from that of a scalar by using a signal or validation metric.

This is a mathematical function which maps two time series on a scalar and is referred to hereinafter as an error measure. A relevant error measure is, for example, the mean squared error (MSE) defined as follows:

$$\frac{1}{n}\sum_{i=1}^{n}(Y_i - X_i)^2$$

The basic feature here is to express the correspondence or deviation between the set of simulation and reference time series as a scalar. For this purpose, the former are compared to the latter in pairs on the basis of an arbitrary error measure. The results of these comparisons in pairs are then interpreted as an empirical probability distribution of the discrepancy between simulation and reference data.

It is assumed that $N_1$ different time series are provided, which were detected in the simulation—possibly by variation of individual parameters. In addition, $N_2$ time series exist, which are to be used as a reference, for example experimental results from measurements on the simulated system. The first simulation time series is now initially observed and compared in succession to all reference time series, an error measure being used which appears suitable in this case. A corresponding procedure is used with all remaining time series of the simulation data set. $N_1 \cdot N_2$ function values of the error measure thus result. The distribution of these results may be visualized by plotting a histogram or the function graph of its distribution function; such representations are widespread and are to be interpreted without problems by the expert observer.

If such results are to be used for a validation, a suitable quality criterion may thus be formulated accordingly as a maximum proportion of the results which indicate an unsuitability of the simulation. Thus, to establish the validity, it could be required, for example, that at most 10% of the comparisons may result in an error greater than 1.

The refinement according to the present invention of this method may yield the advantage of making use of the various types of parameters: aleatoric, which occur naturally during an experiment, and epistemic, which are not yet established, but are nonetheless to be ascertained. On this foundation, on the one hand, it opens up a simple possibility for estimating the epistemic parameters of the model, i.e., calibrating the latter using the reference data set, but, on the other hand, it also permits the recognition of outliers either in the simulation or in the reference data set. These may in turn be removed from the data pool.

Expressed generally, conventional MBT methods may be expanded in this way in order to take into consideration different uncertainties to which the simulation is subject.

Advantageous refinements and improvements of example embodiments of the present invention are possible by way of the measures described herein. A use in the field of automated driving and other automated systems, for example robotics, may thus be provided. In particular, in these areas of use, a verification and validation according to the present invention of embedded systems may permanently increase their functional reliability.

The example method in accordance with the present invention proves to be extremely flexible here, since different error measures may be used to give information about the average deviation between simulation and reference, from whose distribution statistical location and scattering parameters such as mean value, median, and variance are to be calculated.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

Figure 1:
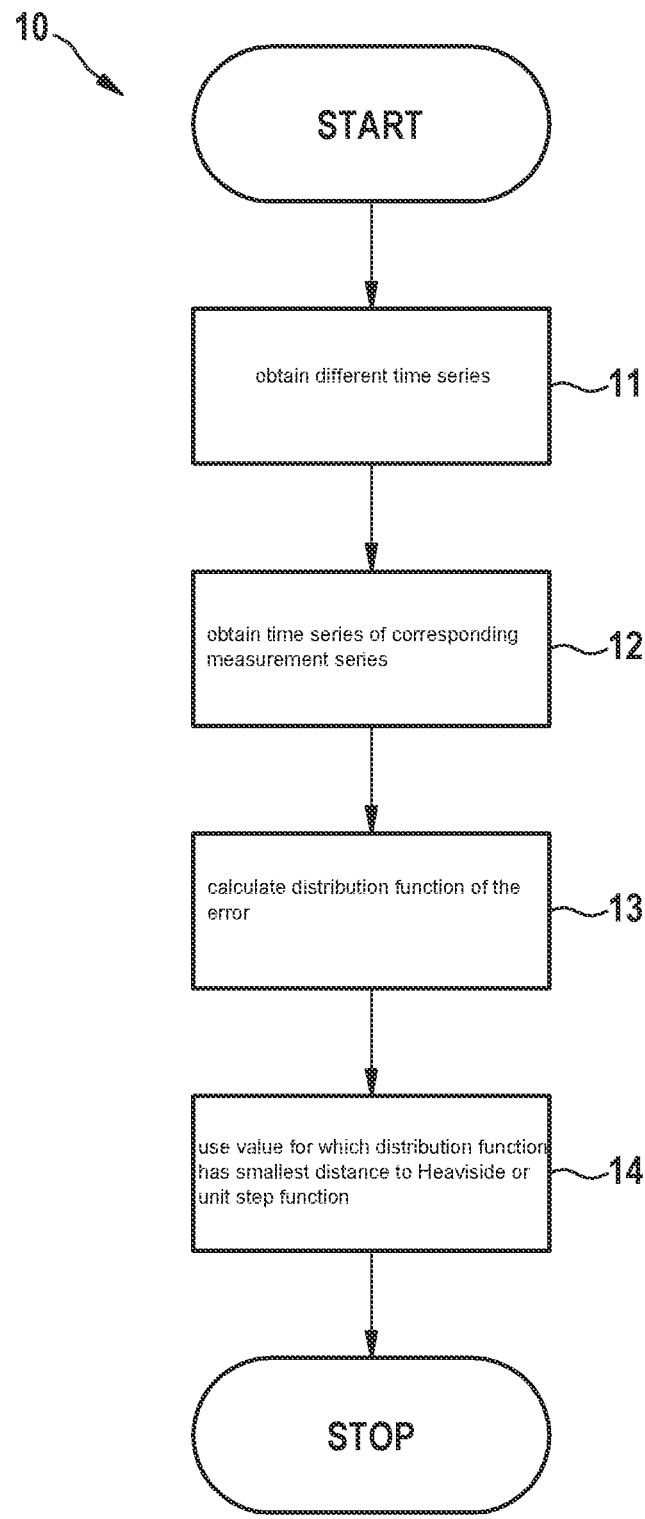
FIG. 1 shows the flowchart of a method according to a first specific example embodiment in accordance with the present invention.

FIG. 1 illustrates the fundamental steps of a method 10 according to an example embodiment of the present invention. With the aid of the simulation model, initially $N_1$ different time series are obtained (process 11). If aleatoric and also epistemic parameters are varied, the simulation results may thus be summarized in a $m_1 \times n_1$ matrix, in which, for example, the lines contain the aleatoric parameters with a fixed set of epistemic parameters. Therefore, $m_1$ different epistemic parameter combinations—each having $n_1$ aleatoric variable parameters—are provided.

The time series of corresponding measurement series are then obtained by corresponding measurements on the system (process 12), which are to be used as the reference basis for a validation or calibration of the simulation model. The comparison of each of its entries to each of these reference time series quasi adds a further dimension to said matrix. Two possible choices are now available for taking this circumstance into consideration: The additional dimension may be observed as either of aleatoric or epistemic nature. Either a $m_1 \times (n_1 \cdot N_2)$ matrix or a $(m_1 \cdot N_2) \times n_1$ matrix results from these alternative ways of consideration.

In the following, a reason is set forth for considering the additional dimension as aleatoric. The variation of both epistemic and aleatoric parameters may be mathematically modeled in the following way: If f(a,b) is the simulated time series which is dependent on epistemic parameters a and aleatoric parameters b, it follows that b may be viewed as a random variable having a certain probability distribution $P_b$. Therefore, f is also a random time series which is additionally dependent on parameters a. In other words: b is random, while a denotes the deliberate possible influences on the simulation model.

Reference g also represents a random time series of unknown distribution, from which a random sample is drawn. Given an error measure d, d(f(a,b),g) may be determined (process 13). It follows from the above statements that this is also a random variable, more precisely a family of random variables for each value of epistemic parameter a. A random sample from the probability distribution of this variable is given by the above-mentioned $m_1 \times (n_1 \cdot N_2)$ matrix.

To improve the simulation, preferably that value is to be used (process 14), for which distribution function 16 has the smallest distance to the Heaviside or unit step function $\Theta$: $\mathbb{R} \ominus \{0,1\}$ where $\theta(x)=0$ for $x<0$ and $\Theta(x)=1$ for $x \geq 0$, since the simulation model for this value of the epistemic parameter most accurately simulates the properties of the real system.

Figure 2:
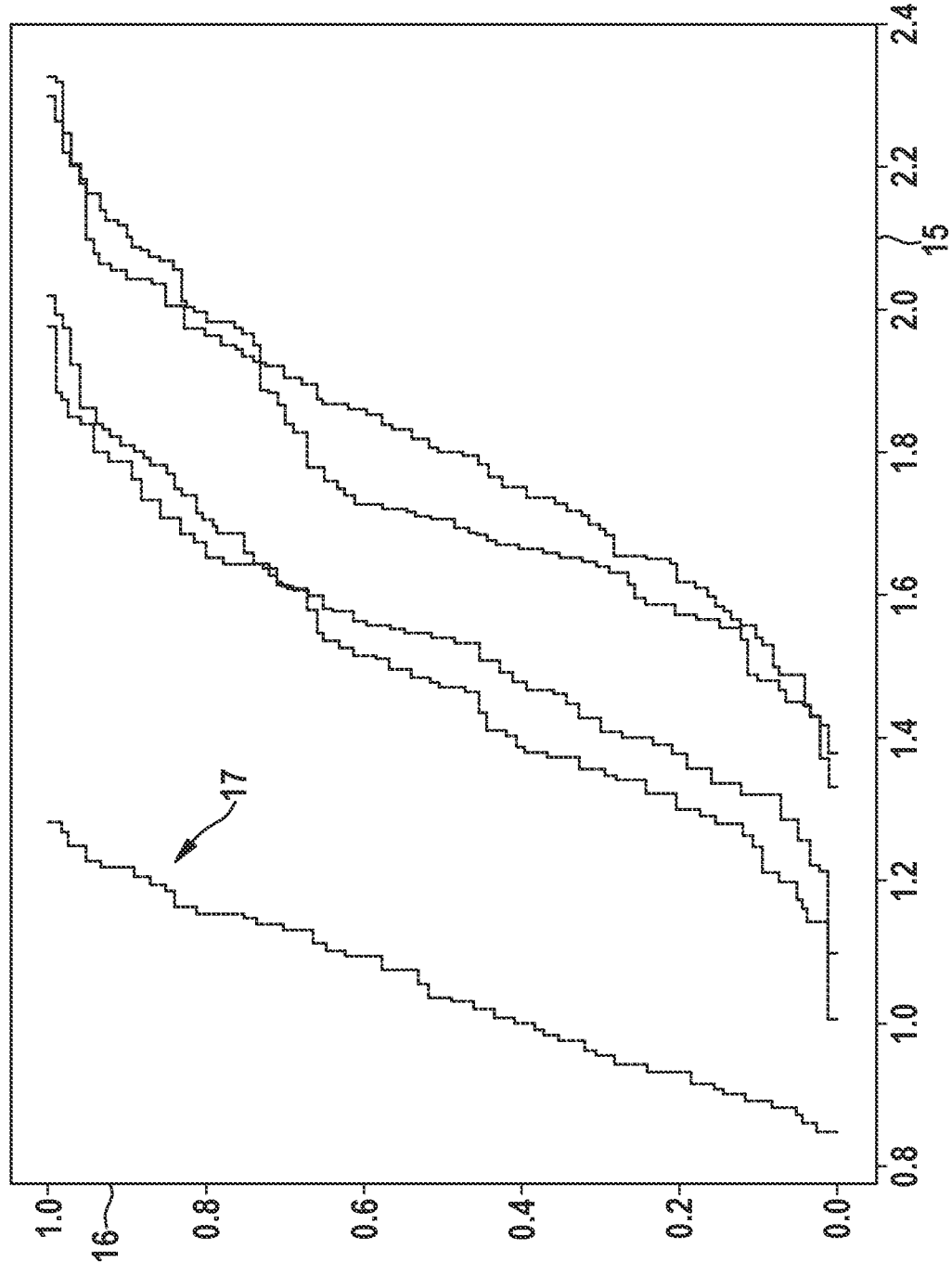
FIG. 2 shows a first set of curves.

In the example according to FIG. 2, this is distribution function 16, whose function graph is provided with reference numeral 17. For example, the area validation metric, which is routine in scientific calculations, is suitable as a distance measure for determining this distribution function 16.

Figure 3:
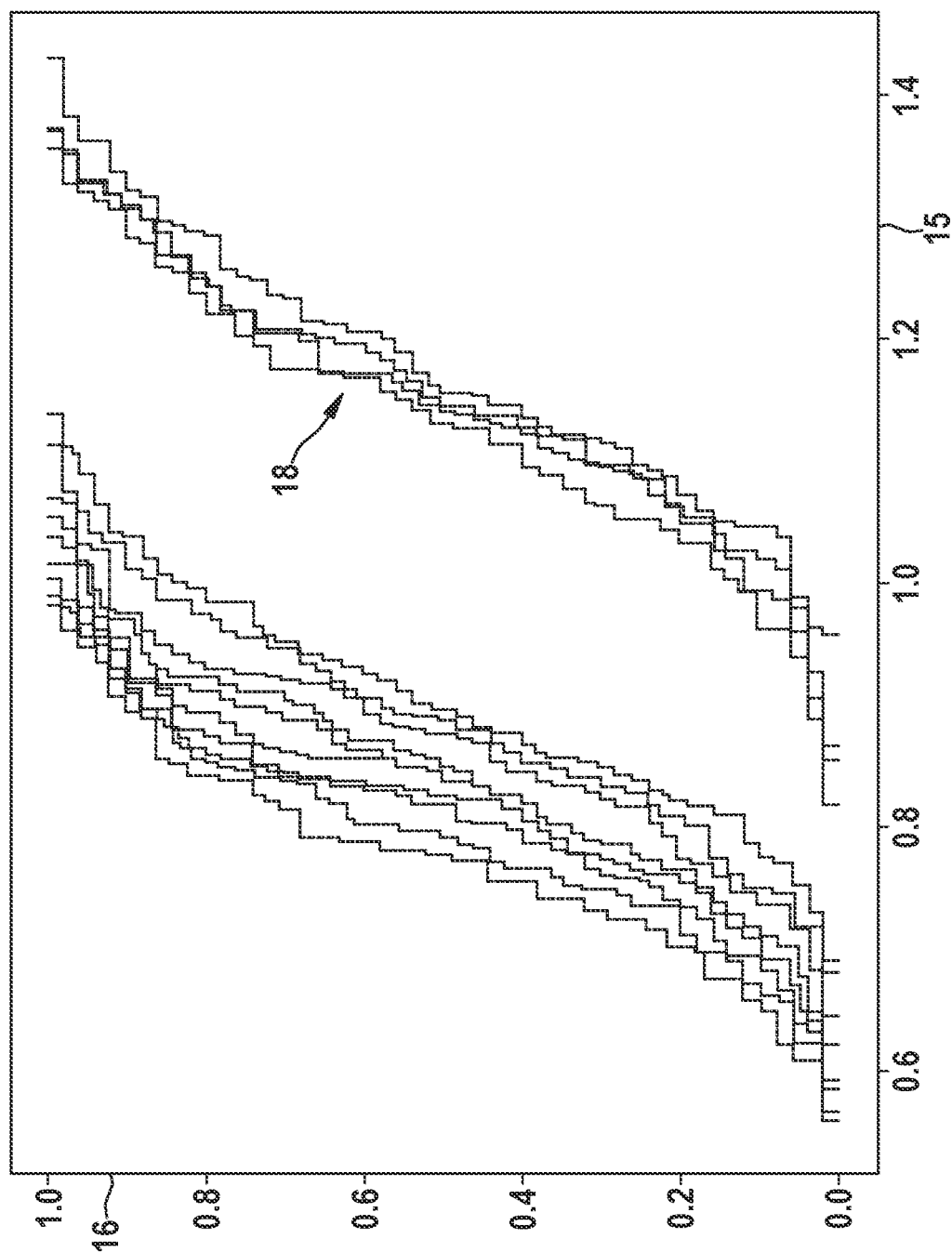
FIG. 3 shows a second set of curves.

On the other hand, if the additional dimension of the matrix is associated with the epistemic parameters, so-called outliers may thus be recognized on the basis of a corresponding representation. This is enabled in that now each measurement series is also reflected in a separate function graph. Distribution functions 16 calculated for error measure 15 of atypical measurement series, whose function graphs are provided with reference numeral 18 in the example according to FIG. 3, therefore stand out due to their clearly recognizable offset from the remainder of the set of curves even upon brief observation.

Figure 4:
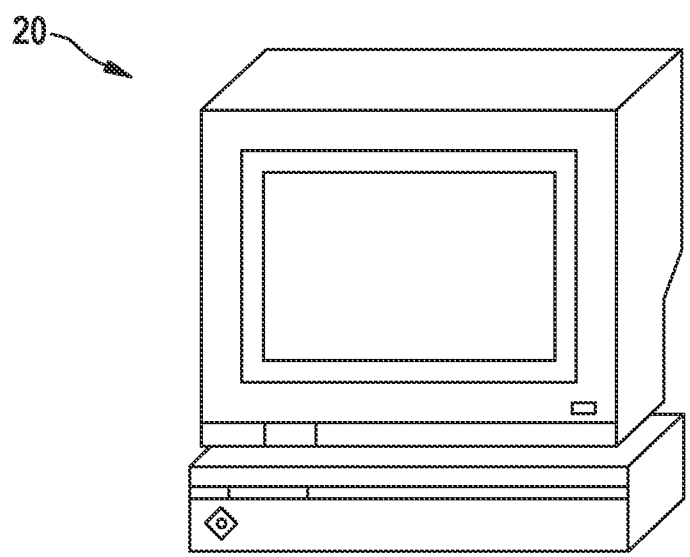
FIG. 4 schematically shows a control unit according to a second specific example embodiment in accordance with the present invention.

This method 10 may be implemented, for example, in software or hardware or in a mixed form made up of software and hardware, for example in a workstation 20, as the schematic view of FIG. 4 illustrates.

What is claimed is:

1. A method for simulating a technical system, comprising the following steps:
obtaining a plurality of different time series of a quantity of interest of the technical system using a simulation model of the technical system, wherein, in the obtaining step, for each respective time series of the plurality of different time series, a value of at least one epistemic parameter of the simulation model is varied relative to a value of the epistemic parameter for the other time series of the plurality of different time series so that each of the plurality of different time series is obtained, using the simulation model, using a different value for the epistemic value of the simulation model relative to one another;
obtaining at least one measurement series of the quantity of interest by performing corresponding measurements on the technical system;
determining, for each value of the different values of the epistemic parameter, a real-value error measure of the respective time series for the value of the different values with respect to the measurement series, and determining a distribution function of each of the error measures;

adjusting the simulation model by setting the epistemic parameter to that value of the different values of the epistemic parameter for which adjusting the simulation model by setting the epistemic parameter to that value of the different values of the epistemic parameter for which the distribution function has a smallest distance to a Heaviside function;

simulating the technical system using the adjusted simulation model; and checking a functional reliability of the technical system based on the simulating.

2. The method as recited in claim 1, wherein:
multiple measurement series corresponding to one another are obtained by the measurements,
the determination of the error measure and the distribution function is carried out for each of the measurement series, and
those measurement series of the multiple measurement series for which the distribution functions exceed a predetermined distance to remaining ones of the distribution functions are deleted from the measurement series.

3. The method as recited in claim 1, wherein:
the distance is ascertained according to an area validation metric.

4. The method as recited in claim 1, further comprising:
representing function graphs of the distribution functions.

5. The method as recited in claim 1, wherein each error measure is a mean square error.

6. The method as recited in claim 1, wherein:
the technical system is an embedded system.

7. The method as recited in claim 1, wherein:
the technical system is configured to control a vehicle autonomously, or
the technical system is configured to control a manufacturing process.

8. A non-transitory machine-readable storage medium on which is stored a computer program for simulating a technical system, the computer program, when executed by a computer, causing the computer to perform the following steps:

obtaining a plurality of different time series of a quantity of interest of the technical system using a simulation model of the technical system, wherein, in the obtaining step, for each respective time series of the plurality of different time series, a value of at least one epistemic parameter of the simulation model is varied relative to a value of the epistemic parameter for the other time series of the plurality of time series so that each of the plurality of different time series is obtained, using the simulation model, using a different value for the epistemic value of the simulation model relative to one another;

obtaining at least one measurement series of the quantity of interest by performing corresponding measurements on the technical system;

determining, for each value of the different values of the epistemic parameter, a real-value error measure of the respective time series for the value of the different values with respect to the measurement series, and determining a distribution function of each of the error measures;

adjusting the simulation model by setting the epistemic parameter to that value of the different values of the epistemic parameter for which the distribution function has a smallest distance to a Heaviside function;

simulating the technical system using the adjusted model; and checking a functional reliability of the technical system based on the simulating.

9. A device configured to simulate a technical system in an integrated test and simulation environment, wherein the device includes hardware, and the device is configured to:

obtain a plurality of different time series of a quantity of interest of the technical system using a simulation model of the technical system, wherein in the obtaining, for each respective time series of the plurality of different time series, a value of at least one epistemic parameter of the simulation model is varied relative to a value of the epistemic parameter for the other time series of the plurality of time series so that each of the plurality of different time series is obtained, using the simulation model, using a different value for the epistemic value of the simulation model relative to one another;

obtain at least one measurement series of the quantity of interest by performing corresponding measurements on the technical system;

determine, for each value of the values of the epistemic parameter, a real-value error measure of the respective time series for the value with respect to the measurement series, and determine a distribution function of each of the error measures;

adjust the simulation model by setting the epistemic parameter to that value of the different values of the epistemic parameter for which the distribution function has a smallest distance to a Heaviside function;

simulate the technical system using the adjusted model; and check a functionality of the technical system based on the simulating.

10. The method as recited in claim 1, further comprising:
verifying and validating the technical system based on the simulating.

11. The non-transitory machine-readable storage medium as recited in claim 8, wherein the computer program, when executed by the computer, further cause the computer to perform the following step:
verifying and validating the technical system based on the simulating.

12. The device as recited in claim 9, wherein the device is further configured for verifying and validating the technical system based on the simulating.

13. The non-transitory machine-readable storage medium as recited in claim 8, wherein the technical system is configured to control a vehicle autonomously or to control a manufacturing process.

14. The non-transitory machine-readable storage medium as recited in claim 8, wherein the technical system is an embedded system.

15. The device as recited in claim 9, wherein the technical system is an embedded system.

16. The device as recited in claim 9, wherein the technical system is configured to control a vehicle autonomously or to control a manufacturing process.

17. The method as recited in claim 1, wherein the technical system is an embedded system configured to control a vehicle autonomously or to control a manufacturing process.

18. The non-transitory machine-readable storage medium as recited in claim 8, wherein the technical system is an embedded system configured to control a vehicle autonomously or to control a manufacturing process.

19. The device as recited in claim 9, wherein the technical system is an embedded system configured to control a vehicle autonomously or to control a manufacturing process.

* * * * *